United States Patent [19]
Piernot et al.

[11] Patent Number: 6,167,353
[45] Date of Patent: *Dec. 26, 2000

[54] COMPUTER METHOD AND APPARATUS FOR INTERACTING WITH A PHYSICAL SYSTEM

[75] Inventors: Philippe P. Piernot; Marcos R. Vescovi, both of Palo Alto; Adam Jordan, San Francisco; Chris Schmidt, Fairfax; Rafael Granados, Albany, all of Calif.

[73] Assignee: Interval Research Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/018,023

[22] Filed: Feb. 2, 1998

Related U.S. Application Data

[63] Continuation-in-part of application No. 08/675,104, Jul. 3, 1996, Pat. No. 5,953,686.
[60] Provisional application No. 60/070,000, Dec. 17, 1997.

[51] Int. Cl.[7] .................................. G06F 3/00; A63F 3/00
[52] U.S. Cl. ............................ 702/94; 150/152; 356/348; 463/39; 463/40
[58] Field of Search ............................ 702/94, 150, 152; 356/348, 347, 376; 345/158; 248/176.1; 250/550, 221; 324/207.17; 463/40, 39; 434/317, 308, 402

[56] References Cited

U.S. PATENT DOCUMENTS 4,341,385  7/1982  Doyle et al. .

(List continued on next page.)

FOREIGN PATENT DOCUMENTS

91/01543  7/1991  European Pat. Off. .

(List continued on next page.)

OTHER PUBLICATIONS

Wellner, Pierre, Mackay, Wendy, Gold, Rich, Guest Editors, "Computer–Augmented Environments: Back to the Real World Introduction", "Interacting with Paper on the DigitalDesk", vol. 36, No. 7, Communications of the ACM, Jul. 1993.

(List continued on next page.)

*Primary Examiner*—Kamini Shah
*Attorney, Agent, or Firm*—Beyer, Weaver & Thomas, LLP

[57] ABSTRACT

A computer interface system and method is described which includes a way of interfacing with a physical game system. The game system may include a platform having a plurality of regions and a plurality of lots, a plurality of environmental objects positioned within an associated lot of the platform, and a movable object near at least one region. Additionally, each environmental object has an environmental identifier and is a global type or a local type, and each region has a region identifier and a plurality of subregions. The method includes the act of scanning the environmental objects and the movable object to extract data, where the extracted data includes a movable object position of the movable object and an environmental position for each environmental object and associated environmental identifier. The method also includes an act of determining which region is nearest to the movable object by analyzing the extracted data and computing the distance between the movable object and each region that is proximal to the movable object. Additionally the method includes an act of determining which region identifier is associated with the nearest region to the movable object by analyzing the extracted data, determining whether any of the environmental objects are associated with the nearest region by analyzing the extracted data, and determining whether any environmental identifiers are associated with the nearest region by analyzing the extracted data. The method further includes the act of running an audiovisual program based at least on the determinations of the region identifier associated with the nearest region and any environmental that are associated with the nearest region.

38 Claims, 9 Drawing Sheets

U.S. PATENT DOCUMENTS

| | | |
|---|---|---|
| 4,843,568 | 6/1989 | Krueger et al. . |
| 4,873,398 | 10/1989 | Hubby, Jr. . |
| 5,023,408 | 6/1991 | Murakami et al. ......................... 178/19 |
| 5,082,286 | 1/1992 | Ryan et al. .............................. 273/238 |
| 5,088,928 | 2/1992 | Chan ....................................... 273/339 |
| 5,188,368 | 2/1993 | Ryan ....................................... 223/237 |
| 5,330,380 | 7/1994 | McDarren et al. ...................... 446/397 |
| 5,483,261 | 1/1996 | Yasutake et al. ........................ 345/173 |
| 5,511,148 | 4/1996 | Wellner ................................... 395/106 |
| 5,731,801 | 3/1998 | Fukuzaki ................................. 345/146 |
| 5,823,782 | 10/1998 | Marcus et al. ........................... 434/156 |

FOREIGN PATENT DOCUMENTS

| | | |
|---|---|---|
| 0576187 A1 | 6/1992 | European Pat. Off. . |
| 0606790A2 | 7/1994 | European Pat. Off. . |
| 2607400 | 11/1986 | France . |
| 3813779A1 | 11/1989 | Germany . |
| 844011 | 7/1979 | Russian Federation . |
| 2103943 | 7/1981 | United Kingdom . |
| 2237514 | 5/1991 | United Kingdom . |
| 9713221 | 6/1997 | United Kingdom . |
| 9725133 | 11/1997 | United Kingdom . |
| 96/03188 | 2/1996 | WIPO . |
| WO9603188 | 2/1996 | WIPO . |

OTHER PUBLICATIONS

Spreitzer, Mike and Theimer, Marvin, "Scalable, Secure, Mobile Computing with Location Information", vol. 36, No. 7, Communications of the ACM, Jul. 1993.

Baudel, Thomas and Beaudoulin– Lafon, Michel, "CHARADE: Remote Control of Objects using Free–Hand Gestures", vol. 36, No. 7, Communications of the ACM, Jul. 1993.

Krueger, Myron W., "Environmental Technology: Making the Real World Virtual", vol. 36, No. 7, Communications of the ACM, Jul. 1993.

Fitzmaurice, George W., "Situated Information Spaces and Spatially Aware Palmtop Computers", vol. 36, No. 7, Communications of the ACM, Jul. 1993.

Azuma, Ronald, "Tracking Requirements for Augmented Reality", vol. 36, No. 7, Communications of the ACM, Jul. 1993.

Feiner, Steven, MacIntyre, Blair, and Seligmann, Dorée "Knowledge–Based Augmented Reality", vol. 36, No. 7, Communications of the ACM, Jul. 1993.

Resnick, Mitchel, "Behavior Construction Kits", vol. 36, No. 7, Communications of the ACM, Jul. 1993.

Gold, Rich, "This is not a Pipe", vol. 36, No. 7, Communications of the ACM, Jul. 1993.

Weiser, Mark, "Some Computer Science Issues in Ubiquitous Computing", vol. 36, No. 7, Communications of the ACM, Jul. 1993.

Elrod, Scott, Hall, Gene, Costanza, Rick, Dixon, Michael, and des Riviéres, Jim, "Responsive Office Environments", vol. 36, No. 7, Communications of the ACM, Jul. 1993.

Mackay, Wendy, Velay, Gilles, Carter, Kathy, Ma, Chaoying, and Pagani, Daniele, "Augmenting Reality: Adding Computational Dimensions to Paper", vol. 36, No. 7, Communications of the ACM, Jul. 1993.

| ENVIRONMENTAL TYPE | DESCRIPTION |
|---|---|
| Bakery | In the bakery, the player may help the baker make pies and cakes. |
| Clothing store | In the clothing store, the player may help a clerk put clothes back onto a clothing rack. |
| Garage | In the garage, the player may pay for repairs that are performed on her car. |
| Fire station | At the fire station, the player may look at and learn about various fire fighting vehicles and equipment. Additionally, a map of Live City shows fires or other problems that the fire department should respond to. |
| Hair salon | In the hair salon, the player may give Live City characters new hairdos and hair colors. Makeup may also be added to characters. |
| Toy store | At the toy store, custom toys may be made and then given to other characters. |
| School | At the school, the player may do simple learning activities, pretend to be a teacher, and store things in a locker. |
| Dentist | At the dentist's office, the player may pretend to be a dentist. |
| House | The house is where certain characters in Live City live. |
| Market | At the market, various items may be bought to be used in other Live City buildings, such as buying milk and flour for the baker. |
| Pet shop | At the pet shop, the player may get a virtual pet and everything needed to take care of that pet (pet food, toys, beds). |
| Post office | At the post office, the player may receive and send letters to Live City characters. |
| Movie theater | In the movie theater, the player may make and watch simple movies. |
| Hospital | At the hospital, the player may pretend to be a doctor, diagnosing Live City characters and helping them get well. |
| Police station | At the police station, any criminals loose in Live City are tracked. The player may chase after and apprehend those criminals, and return them to the station. |
| Carwash | If the car is driven through the car wash, the computer displays a QuickTime movie of an actual car going through a car wash (first person POV). The car wash also cleans the virtual car if it is dirty. |
| Tunnel | Like the car wash, when driving through the tunnel, the computer displays a QuickTime movie of driving through a real tunnel. |
| Bridge | The bridge may be in two states; up and down. When the bridge is down, the car can drive over it. When the bridge is up, virtual boats can pass underneath it. |
| Clock tower | Moving the hands on the clock tower changes the time of day in Live City. |
| Telephone booth | At the telephone booth, calls may be made to and received from other characters in Live City. |
| Info kiosk | At the info kiosk, the player may receive help, hints, and information about what to do in Live City. |
| Cobblestones | Driving over the cobblestones simply shakes the car up, and could give the car a flat tire. |
| Mud puddle | Driving through the mud puddle gets mud on the car (can be washed off in the car wash). |

Fig. 4

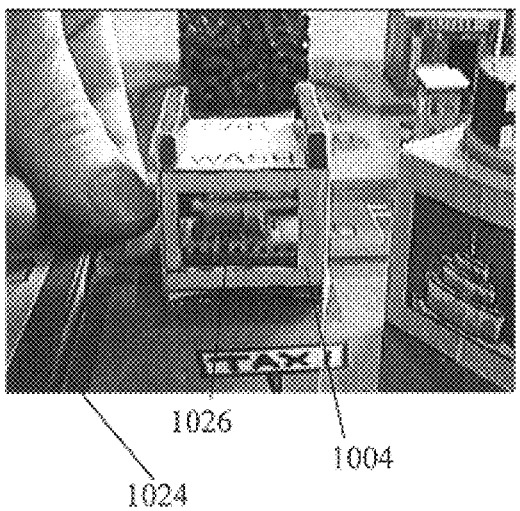
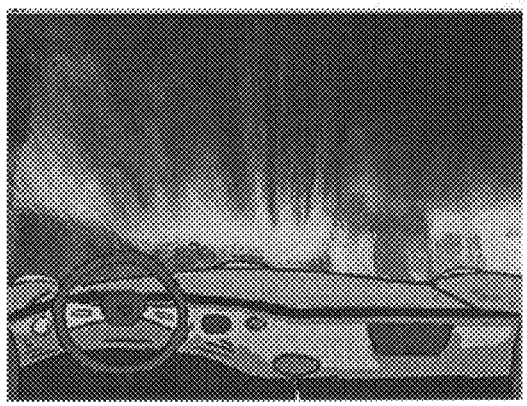
Fig. 10A   Fig. 10B
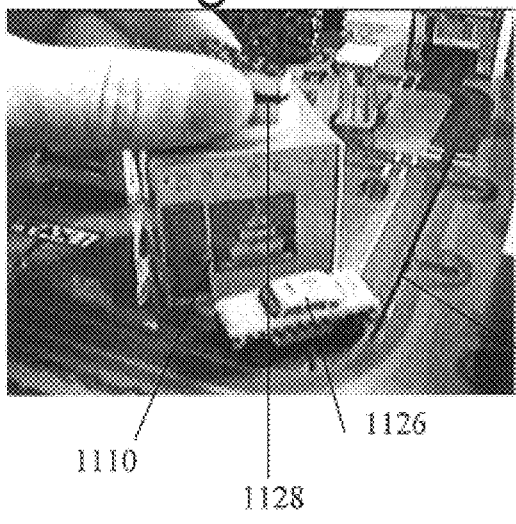
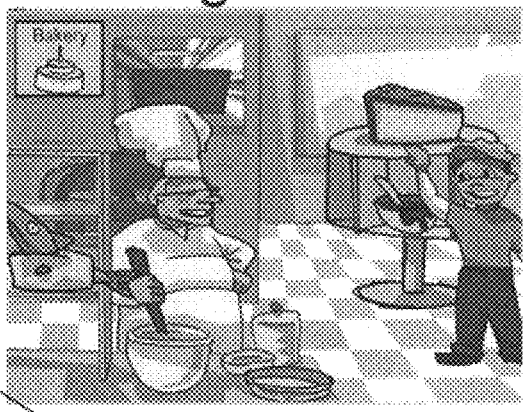
Fig. 11A   Fig. 11B
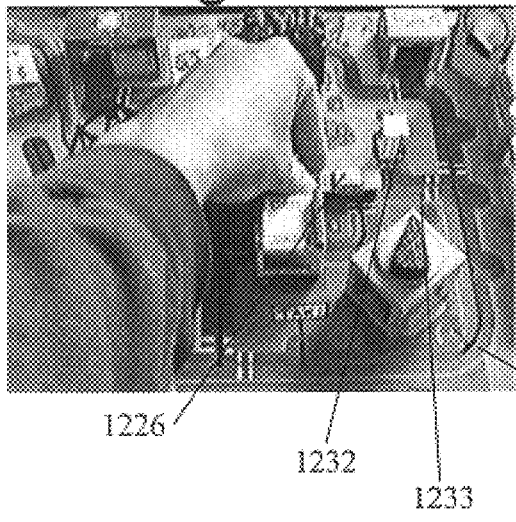
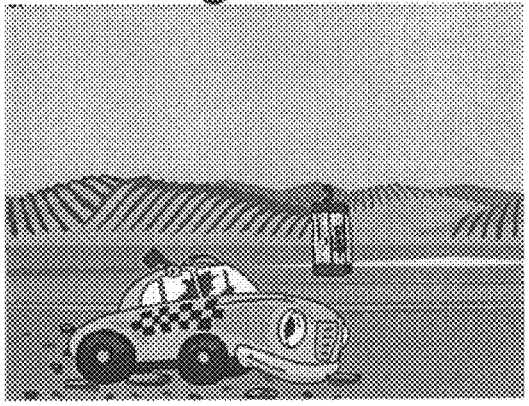
Fig. 12A   Fig. 12B

COMPUTER METHOD AND APPARATUS FOR INTERACTING WITH A PHYSICAL SYSTEM

CROSS REFERENCE TO RELATED APPLICATIONS

This application claims priority under 35 U.S.C. 119(e) of Provisional U.S. patent application Ser. No. 60/070,00, filed Dec. 17, 1997, entitled Computer Method and Apparatus for Interacting with a Physical System by Piernot, et al., and is a continuation in part of U.S. patent application Ser. No. 08/675,104 filed Jul. 3, 1995 now U.S. Pat. No. 5,953,686 entitled, "Video Camera Based Computer Input System With Interchangeable Physical Interface" by Piernot, et al., which are incorporated herein by reference in their entirety for all purposes. This application is related to U.S. patent application Ser. No. 09/017,450 filed concurrently herewith, and to two UK patent applications, UK 9713221.7 filed Jun. 23, 1997 and UK 9725133.4 filed Nov. 27, 1997, which are incorporated herein by reference for all purposes.

BACKGROUND OF THE INVENTION

This invention relates generally to computer interactions with a physical system and interface and more particularly to interactions with physical game systems.

Computers are now used by children for educational, interactive games, and these interactive games have become increasingly popular. Computers have not altogether replaced physical game boards and three-dimensional objects. However, there is a need for a substitute for manipulating physical objects to engage and stimulate creativity. It would be useful if a computer interface could be developed based on interchangeable physical objects that could be linked to an interactive game on the computer.

There are, of course, a number of human/computer interfaces which allow users, with varying degrees of comfort and ease, to interact with computers. For example, keyboards, computer mice, joysticks, etc. allow users to physically manipulate a three-dimensional object to create an input into a computer system. However, these human/computer interfaces are quite artificial in nature, and tend to require a substantial investment in training to be used efficiently. The artificial metaphors tend to break down and systems such as keyboards and mice tend to have inherently low rates of data input.

A number of interfaces are described in the July, 1993 special issue of *Communications of the ACM*, in an article entitled "Computer Augmented Environments, Back to the Real World." which is herein incorporated by reference. The computer augmented environments reviewed in the article include immersive environments, where rooms are filled with sensors to control the settings of the room, as researched at New York University (NYU) in New York, N.Y. Another example found in the article is the electronic white boards of Wacom and others where ordinary-looking erasers and markers are used to create an electronic "ink." Wellner describes a "DigitalDesk" that uses video cameras, paper, and a special work station to move between the paper and the electronic worlds. Fitzmaurice proposes a "Chameleon" unit which allows a user to walk up to a bookshelf and press a touch-sensitive LCD strip to hear more about a selected book. Finally, MIT Media Lab has a product known as "Programmable Brick" which lets children program by snapping plastic building blocks together, where each of the building blocks includes an embedded microprocessor.

U.S. Pat. No. 4,873,398 issued to Hubby describes a digitizing tablet which is also a flat panel display. The system enables different scenes to be displayed on the tablet while a stylus which emits light moves across the transparent or translucent display surface. The light from the stylus is sensed and its position is used as input to a computer system. Although the scene projected on the display may change and the stylus may take different forms (such as a wide beam airbrush or fiber optic paint brush), the display surface itself does not change and the system is adapted to receive input only from a stylus which produces light at the designed frequency. The system does not identify the stylus and interpret the input based on the identity. The system responds to radiation at the designed wavelength, from whatever source, and "inks" the display (i.e. causes pixels of the flat panel display to become excited) at the corresponding location. The location of a stylus or pen provides input as it moves in contact with the surface of the tablet.

U.S. Pat. No. 4,843,568 issued to Krueger et al. describes a system which observes a user and provides input based on the user's movement. Krueger et al. teaches a way to get input directly from the motion of a user without the use of user movable objects as part of the human/computer interface. While strides have been made in attempting to improve human/computer interfaces, there is still progress to be made in this field. Sensor based interface systems must somehow interpret input data from sensor signals in a way that makes sense to the user with respect to the real world.

Although the DigitalDesk and the optical display tablet provide a limited metaphor of a human/computer interface, there is a need for an improved interface which will provide a set of interchangeable physical objects linked to a computer game or other program. That is, what is needed is a method and apparatus for interfacing with movable interactive objects within a physical system, where the objects represent virtual objects that are manipulated in the computer program when the physical objects are manipulated by the user.

SUMMARY OF THE INVENTION

Accordingly, the present invention provides a system and method for interfacing with a physical game system in a complex manner. The game system includes physical objects, or game pieces. A user may move the physical objects within the game system or add and remove physical objects to and from the game system. When the user interacts with the physical objects, a corresponding audio-visual program is run.

In one embodiment, the game system includes a platform having a plurality of regions and a plurality of lots, a plurality of environmental objects positioned within an associated lot of the platform, and a movable object near at least one region. Additionally, each environmental object has an environmental identifier and is a global type or a local type, and each region has a region identifier.

In this embodiment, the method includes the act of scanning the environmental objects and the movable object to extract data, where the extracted data includes a movable object position of the movable object and an environmental position for each environmental object and associated environmental identifier. The method also includes an act of determining which region is nearest to the movable object by analyzing the extracted data and computing the distance between the movable object and each region that is proximal to the movable object. Additionally the method includes an act of determining which region identifier is associated with the nearest region to the movable object by analyzing the extracted data, determining whether any of the environmental objects are associated with the nearest region by analyzing the extracted data, and determining whether any environmental identifiers are associated with the nearest region by analyzing the extracted data. The method further includes the act of running an audiovisual program based at least on the determinations of the region identifier associated with the nearest region and any environmental that are associated with the nearest region.

In another embodiment, a physical toy system is disclosed that includes a platform having a plurality of regions, a plurality of environmental objects positioned over the platform, and a movable object near at least one region. Additionally, each environmental object has an environmental identifier and is a global type or a local type, each region has a region identifier and a plurality of subregions, and at least one of the environmental objects includes an interactive device that has a plurality of environmental states.

In this embodiment, the method includes the act of scanning portions of the toy system to extract data, where the extracted data includes a movable object position of the movable object and an environmental position for each environmental object and associated environmental identifier. The method also includes an act of determining which region is nearest to the movable object by analyzing the extracted data and computing the distance between the movable object and each region that is proximal to the movable object. Additionally the method includes an act of determining which region identifier is associated with the nearest region to the movable object by analyzing the extracted data, determining whether any of the environmental objects are associated with the nearest region by analyzing the extracted data, and determining whether any environmental identifiers are associated with the nearest region by analyzing the extracted data. The method further includes the act of running an audiovisual program based at least on the determinations of the region identifier associated with the nearest region and any environmental that are associated with the nearest region.

In another embodiment, a computer system for interacting with the game system is disclosed. The computer system includes a data input device for receiving data that is extracted from the physical system, the extracted data including a movable object position of the movable object and an environmental position for each environmental object and associated environmental identifier. The computer system also includes a data interpreter for analyzing the extracted data to determine which region is nearest to the movable object, which region identifier is associated with the nearest region, whether any of the environmental objects are associated with the nearest region, and which environmental identifiers are associated with the nearest region. The computer system further includes a display device for outputting an interactive visual image that is related to the determined nearest region and corresponding region identifier, the environmental objects, and environmental identifiers that are associated with the nearest region.

In yet another embodiment, a computer interface device for receiving input from the game system is disclosed. The computer interface device includes an input device for receiving extracted data from the physical system. The extracted data includes a current position of the movable object relative to the plurality of environmental objects and associated defined type. The computer interface device also includes an interface processor for selecting one of the images based on an analysis of the extracted data. The interface processor is operable to output a first image having a first perspective view and a second image having a second perspective view that is different than the first perspective view. The computer interface device further includes an output device for receiving input from the interface processor and for outputting the selected image to the audiovisual device. In another embodiment, a machine readable medium storing program instructions for interfacing with a physical system is also disclosed.

The embodiments of the current invention have many advantages over the conventional interfacing techniques and apparatus. For example, the present invention provides a user with a complex metaphor of the computer/human interface. The user is able to interact with three-dimensional objects, for example, in a meaningful manner; an audiovisual program that is in response to the user's interactions with the physical objects greatly enhances the physical experience by providing varying audio and visual effects.

BRIEF DESCRIPTION OF THE DRAWINGS

FIG. 4 is a table that includes a list of environmental objects that are used in one embodiment of the current invention.

FIG. 10A shows a portion of the game board in accordance with one embodiment of the current invention.

FIG. 10B shows an audiovisual program that corresponds with the portion of the game board of FIG. 10A in accordance with one embodiment of the current invention.

FIG. 11A shows a portion of the game board in accordance with an alternative embodiment of the current invention.

FIG. 11B shows an audiovisual program that corresponds with the portion of the game board of FIG. 11A in accordance with an alternative embodiment of the current invention.

FIG. 12A shows a portion of the game board in accordance with an alternative embodiment of the current invention.

FIG. 12B shows an audiovisual program that corresponds with the portion of the game board of FIG. 12A in accordance with an alternative embodiment of the current invention.

DETAILED DESCRIPTION OF THE PREFERRED EMBODIMENTS

While this invention has been described in terms of several embodiments and specific examples, there are alterations, permutations, and equivalents which fall within the scope of this invention. It is therefore intended that the following appended claims be interpreted as including all such alterations, permutations, and equivalents as fall within the true spirit and scope of the present invention.

In general terms, the current invention includes a method and apparatus for interfacing with physical objects in a complex manner. In other words, the computer is used as a means of adding to the physical experience. The present invention may be implemented on any conventional hardware interface system. For example, the current invention is well suited for interfacing with a physical game board, where the user may manipulate physical objects on the game board, or toy board. As the user interacts with the physical objects, the user is provided with a corresponding audiovisual interaction on the computer, which interaction greatly enhances the game experience. Of course, an audiovisual interaction may include a audio interaction, a visual interaction, or both.

Although the following description is in reference to a game board, of course, it should be well understood by those skilled in the art that the application of the current invention is not limited to a game board, but may be implemented with any appropriate physical objects where the audiovisual interaction methods and apparatus embodiments of the current invention may enhance the physical experience. Additionally, although the following description is in reference to a game board that uses an optical detection system to detect the physical objects and input to a computer, it should be recognized that other detection systems may be used, such as electromagnetic sensors or electronic sensors. Several examples of electromagnetic detection systems are described in two UK patent applications: UK 9713221.7 filed Jun. 23, 1997 and UK 9725133.4 filed Nov. 27, 1997, which are herein incorporated by reference. Although the following description is in reference to a computer system interface, it should be understood that other type of interfaces may be used, such as a television game system or set top box.

Figure 1:
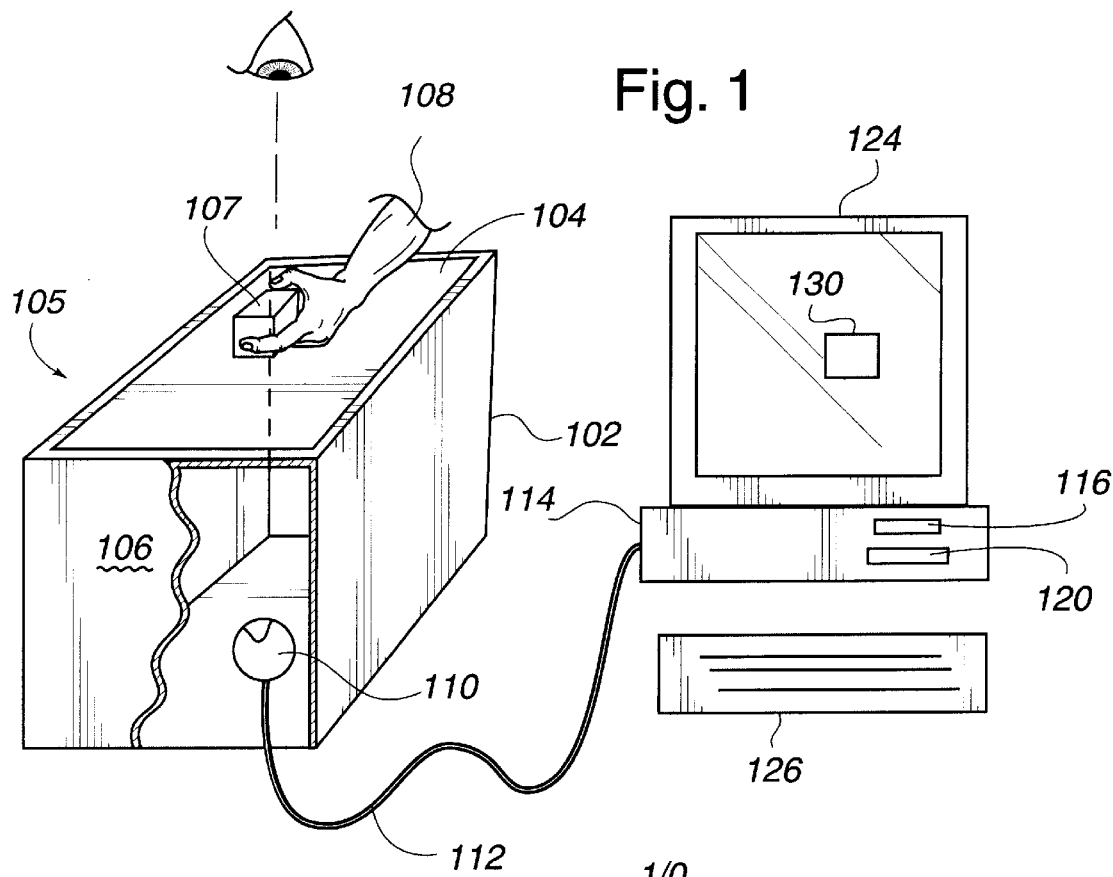
FIG. 1 shows a video camera computer input system with an interchangeable physical interface used in one embodiment of the current invention.

FIG. 1 shows a video camera computer input system with an interchangeable physical interface used in one embodiment of the current invention. Member supporting frame 102 supports spatial reference member 104. The body of spatial reference member 104 separates a first spatial region 105 which includes the first surface of spatial reference member 104 from a second spatial region 106 which includes the opposing second surface of spatial reference member 104. A physical object 107 that may be manipulated by a user 108 is located in the first spatial region 105. Optical detector 110 is located in the second spatial region 106 and is oriented to observe optical indicia associated with physical object 107. In one embodiment, Optical detector 110 is a QuickCam® video camera manufactured by Connectix, Inc. in San Mateo, Calif. In other embodiments, Optical detector 110 is a CCD array or infrared detector or CMOS sensor, for example, by Omnivision of San Jose, Calif.

Information from optical detector 110 is fed by I/O cable 112 to processing unit 114. Processing unit 114 preferably includes floppy disc drive 116 into which floppy disc 118 containing programming information or data is inserted, and CD-ROM drive 120 into which a CD is inserted. Processing unit 114 is also connected to monitor 124, keyboard (not shown), and mouse (not shown). One of ordinary skill will recognize that other forms of fixed or removable storage media can also be included.

Visual image 130, shown on monitor 124 in FIG. 1, is an image of physical object 107. Visual image 130 is an example of an optical indicia which is associated with physical object 107 and observed by optical detector 110. Other optical indicia include an infrared signal emitted or reflected from physical object 107, in which case optical detector 110 is an infrared detector, or any other signal or object which tracks object 107. The optical indicia is displayed directly on monitor 124, and the optical indicia is used as input into a computer program.

Figure 2:
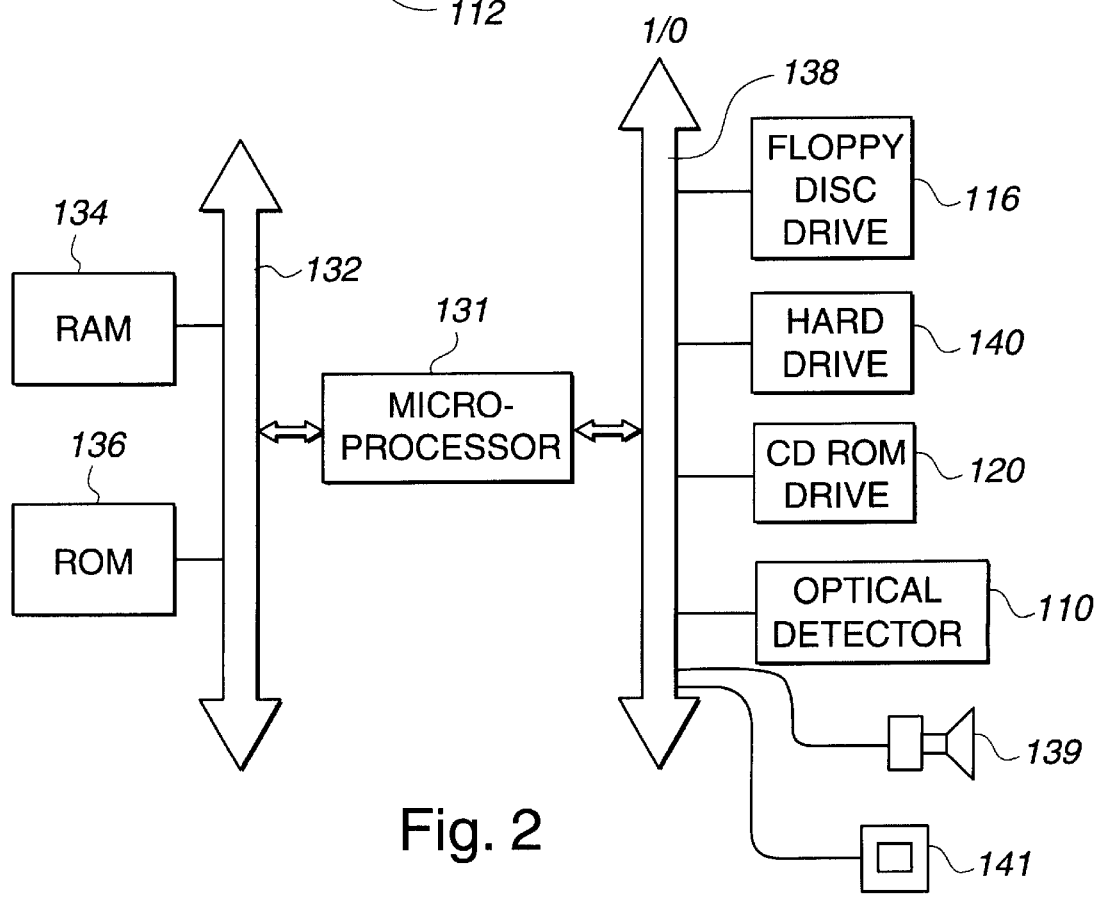
FIG. 2 shows processing unit of FIG. 1, which includes microprocessor, used in one embodiment of the current invention.

FIG. 2 shows processing unit 114 of FIG. 1, which includes microprocessor 131, in more detail, used in one embodiment of the present invention. Microprocessor 131 is connected to memory bus 132, which passes signals to and from random access memory 134 and read-only memory 136. Microprocessor 131 is also connected to I/O bus 138 which passes signals to and from floppy disc drive 116, hard disc drive 140, CD-ROM drive 120, optical detector 110, speaker 139, and monitor 141.

One feature of an embodiment of the present invention is that a number of spatial reference members 104 can be interchangeably connected to member supporting frame 102. As shown below, there are spatial reference members having different surface characteristics, various movable parts, and different optical properties or combinations of optical properties. For purposes of the following examples, the spatial region containing objects which are manipulated by a user will be referred to as lying "above" spatial reference member 104, and the spatial region from which the objects are observed will be referred to as lying "below" spatial reference member 104. It should, however, be recognized that either member supporting frame 102 or spatial reference member 104, or both, may be rotated in any direction so that the first spatial region 105 may lie partially or wholly beside or below the second spatial region 106 depending on the orientation of spatial reference member 104.

One example of an interchangeable spatial reference member is a game board. In general, the present invention greatly enhances the physical game experience by providing a rich audiovisual experience that is directly tied to a user's interaction with a physical game board. One embodiment of a game board will now be described with reference to FIGS. 3A and 3B.

Figure 3A:
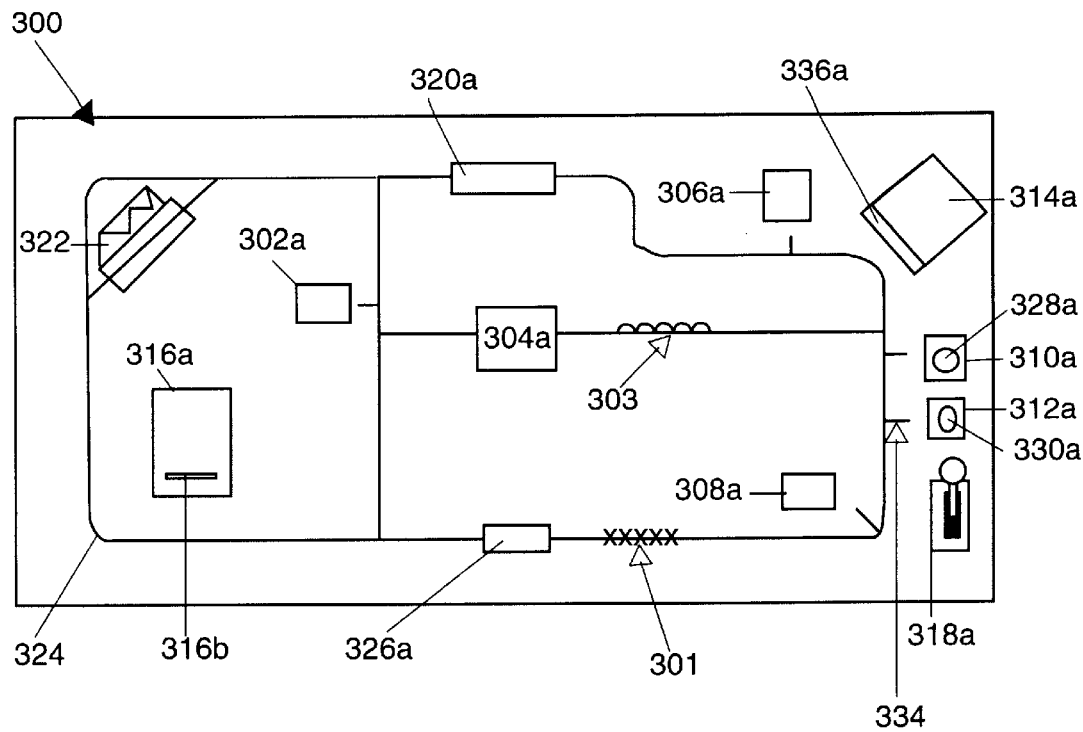
FIG. 3A is a top view of a game board in accordance with one embodiment of the present invention.
Figure 3B:
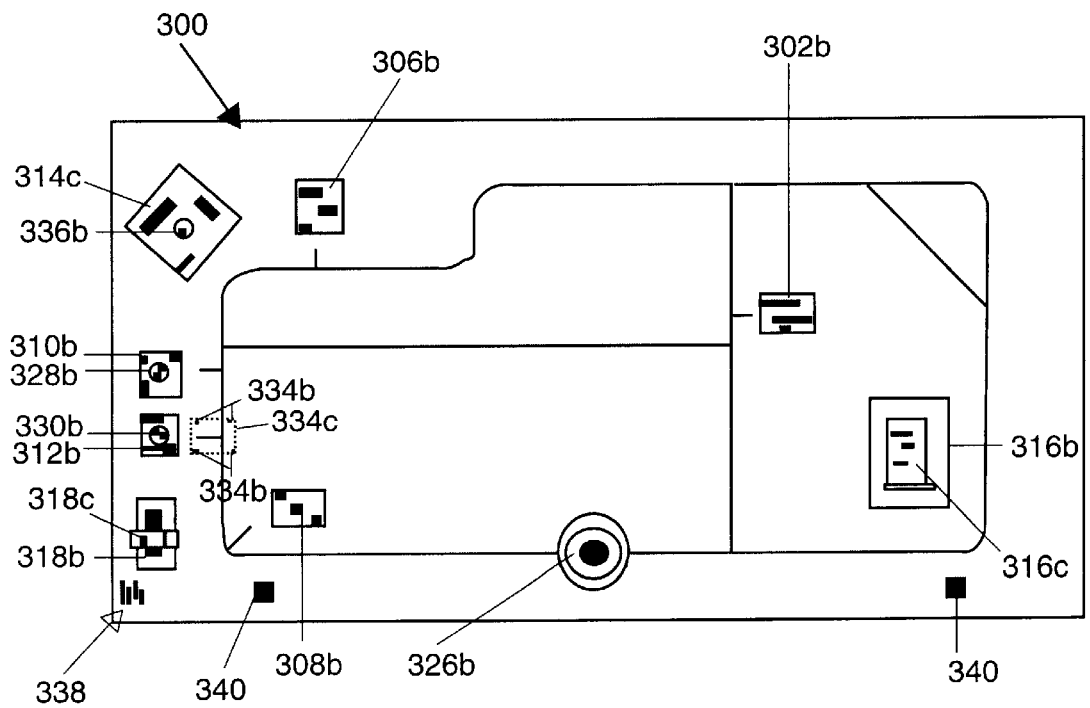
FIG. 3B is a bottom view of the game board of FIG. 3A in accordance with one embodiment of the current invention.

FIG. 3A is a top view of a game board 300, and FIG. 3B is a bottom view of the game board 300 in accordance with one embodiment of the current invention. The game board may be coupled with the member supporting frame 102 of the video camera based computer input system of FIG. 1.

In this embodiment, the top of the game board 300 is configured to look like a city. That is, the top of the game board has three-dimensional pieces that represent various city components, such as building, cars, etc. One version of game board 300 is called Live City designed by Interval of Palo Alto, Calif. Although the following embodiment is described in reference to the board game Live City, it should be well understood that other types of game boards and associated pieces may be used with the present invention.

As shown, a road system 324 is laid out on the game board 300. The road system 324 is configured such that the player may move a movable object 326 within or over the road system. Preferably, the road system is in the form of a slot that receives the movable object such that a player may slide the movable object 326 within the slot. The movable object 326 may be permanently coupled to the road system 324 or detachable from the road system 324. The movable object 326 may be in any suitable form that is appropriate for the particular game being played. For example, in Live City the movable object 326 is a toy taxi car. Although one movable object 326 is shown, it should be well understood that more than one movable object may be on the game board 300.

The game board may also have many other two- or three-dimensional objects (herein after refereed to as "environmental objects"), besides the movable object 326, positioned on the top surface. In this embodiment, these environmental objects represent real objects within a real city. For example, the game board 300 may include a plurality of environmental objects (e.g., 302, 304, 306, 308, 310, 312, 314, 316, 318, and 320) that may take a number of different forms within the same game board, such as business buildings, private homes, infrastructure, and interactive devices. For example, in this embodiment, the environmental objects include a house 302, a car wash 304, a car repair shop 306, a fire station 308, a bakery 310, a clothing shop 312, a clock tower 314, a card reader 316, a lever 318, a tunnel 320. An illustrative list of environmental objects are described in FIG. 4. Additionally, each building may have a plurality of sides, where each side represents a different type of building. In another embodiment, the environmental objects may be integrated into the top surface. In other words, the environmental objects may be two- or three-dimensional.

The game board 300 may also include a plurality of lots (not shown) that are configured to receive the environmental objects. That is, the player may place an environmental object, such as a bakery 310, into a particular lot, later remove the bakery from the lot, and then insert a new environmental object, such as a clothing store, into the same lot. The lots may be in any form that is suitable for receiving environmental objects. In this embodiment, the lots are in the form of rectangular shaped depressions that are configured to receive rectangular shaped environmental objects, such as buildings. Of course, lots would not be required with the implementation of electromagnetic sensing technology.

More specifically, some of the environmental objects may be placed next to notch regions (e.g., 334a) of the road system 324. These notch regions allow the player to park the movable object 326 in front of a particular environmental object (e.g., 308a). By parking the movable object, an interactive audiovisual program associated with the particular environmental object may be initiated, which program is described in more detail below. An environmental objects may have one associated notch, more than one associated notch, or no associated notches.

Some of the environmental objects may be coupled with a local interactive device that may be manipulated by the player, such as a rotating knob, switch, sliding lever, and button. As shown, the bakery 310 and the clothing store 312 have a rotating knob on the top of each building (e.g., 328a and 330a, respectively). By way of another example, the clock tower 314 includes a clock face 336a with hands by which the player may set the time.

In addition to these local interactive devices, the game board 300 also includes global interactive devices, such as card readers, levers, buttons, and joysticks. As shown, the game board 300 includes card reader 316, which has a slot 316b for receiving encoded cards (e.g., 316c of FIG. 3B) and lever 318. As will be described in more detail later, the player may manipulate the local and global interactive devices as a means of interfacing with the computer.

The game board 300 also includes some infrastructure features, such as a bridge 322, a tunnel 320a, a muddy portion 301 and a bumpy portion 303 of the road system 324. These infrastructure features may provide a tactile experience for the player. For example, when the player drives the taxi 326 over the muddy portion, the muddy portion is configured to provide extra friction between the taxi 326 and the road 324. This extra friction may be added to the top or bottom surface of the game board 300. In one embodiment, a rubber surface provides friction. By way of another example, the bumpy portion 303 has physical bumps built into the top or bottom of the game board 300. Likewise, the bridge 322 may be configured to provide the tactile experience that is analogous to driving over a bridge grating. In contrast, the tunnel 320 does not provide a tactile experience. All of the infrastructure features are configured to provide the player with a means of interacting with the computer, which interaction will be described below.

In reference to FIG. 3B, the hardware interface between the game board 300 and the computer will now be briefly described. In general terms, the bottom of the game board 300 includes a plurality of bar codes that are readable by an optical detector (e.g., 110 of FIG. 1). The barcodes are configured to allow extraction of relevant data that is then interpreted to determine which audiovisual program to run. For example, the video camera based computer input system of FIG. 1 extracts data from the barcodes and sends the extracted data to a computer process which then interprets the extracted data and runs an appropriate audiovisual program. This computer process is further described below in reference to FIGS. 5 through 9.

As shown, at least one of the bar codes are associated with each of the movable object (e.g., 326b), the environmental objects (e.g., 306b and 302b), and the local and global interactive devices (e.g., 316c and 318c). The bottom surface of the game board also includes calibration structures 340 that may be used to obtain the relative positions of various objects on the top surface of the game board 300. That is, by detecting the position and orientation of a particular barcode (e.g., the clock tower barcode 314c) in relation to calibration structures 340, the position and orientation of the associated object (e.g., clock tower 314a) may be determined.

By way of example, the lever 318a on the top surface of the game board 300 is coupled with a lever barcode 318c on the bottom surface such that when the player moves the lever 318a on the top surface, the lever barcode 318c on the bottom surface also moves. Thus, the lever barcode's 318c position is indicative of the lever's 318a position. By way of another example, when the player moves a local interactive device of an associated environmental object, such as the interactive device 328a of the bakery 310a, a corresponding interactive device barcode 328b also moves.

Additionally in one embodiment, each notch region 334a of the top surface of the game board 300 has an associated barcode 334b that defines a notch area 334c that encompasses the notch region 334a. This notch area 334c is used to determine whether the movable object 326 is in proximity to the notch region 334a. Alternatively, the locations of all notch regions (along with the locations of regions of the road system) may be stored within a database that is accessed by the computer process that is described below in reference to FIGS. 5 through 9. As shown, the bottom of the game board 300 may also include a board identifier 338 that identifies the particular game board. In this embodiment, the board identifier 338 identifies the game board as a Live City game board.

Figure 5:
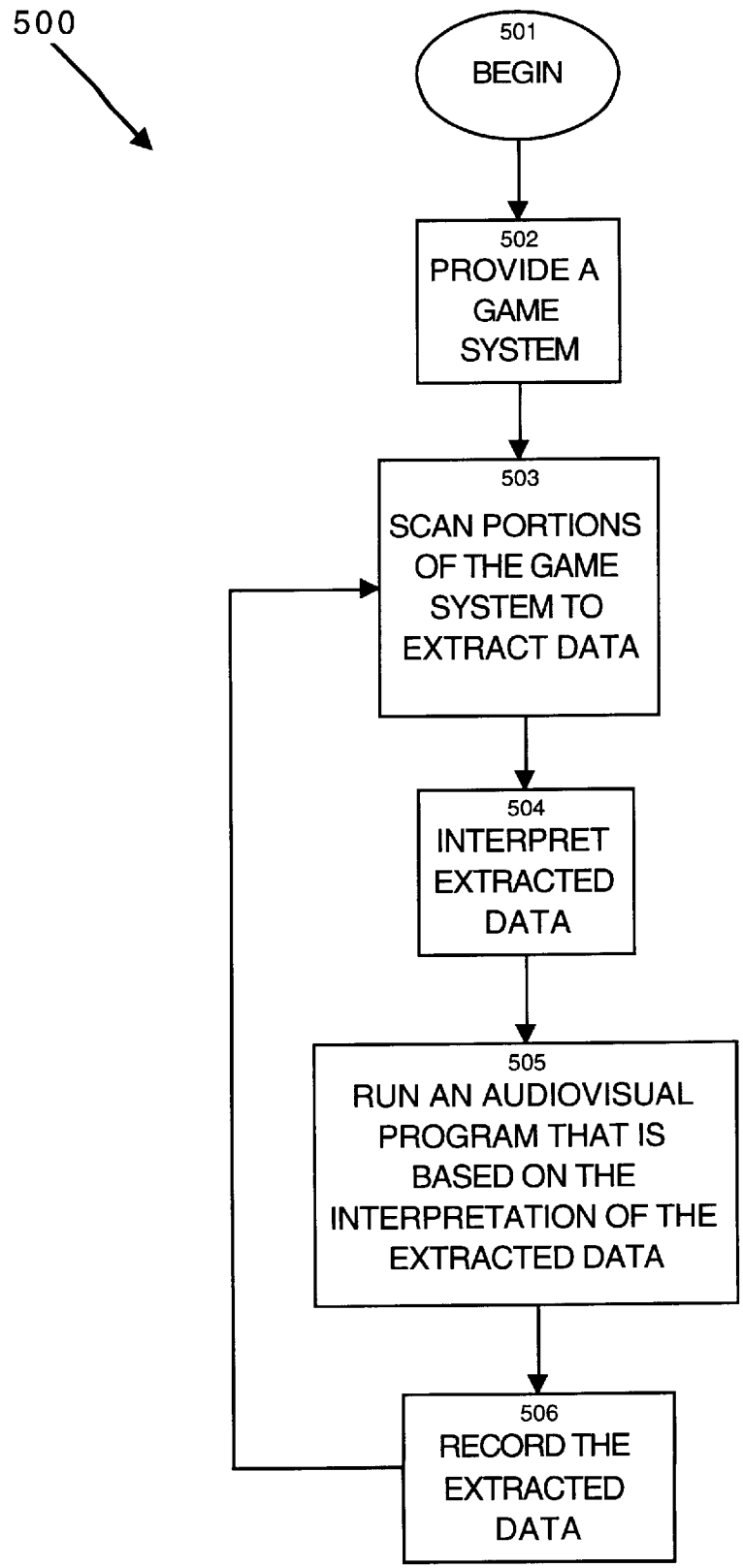
FIG. 5 is a flowchart illustrating a process of interfacing with a game system in accordance with one embodiment of the present invention.

FIG. 5 is a flowchart illustrating a process 500 of interfacing with a game system, such as the game system in FIGS. 3A and 3B, in accordance with one embodiment of the present invention. Initially, a game system is provided in operation 502. In operation 503 portions of the game system are scanned to extract data. The extracted data includes information regarding the moveable objects and the environmental objects. For example, the extracted data includes positions and orientation for each movable object, environmental object, and interactive device. Also, the extracted data may include identifiers associated with each moveable object and environmental object. The extracted data also may include the game board identifier and information regarding a card that is inserted into a card reader (e.g., 316c of FIG. 3B).

After the data is extracted from portions of the game board, the extracted data is interpreted in operation 504. Operation 504 will be described in further detail in reference to FIG. 6. After the data is interpreted, in operation 505 an audiovisual program is run that is based on the extracted data or previously extracted and recorded data. For example, the relative position of regions of the road system and the previous movable object positions may be previously recorded and accessed by any audiovisual program. Operation 505 is explained in more detail below with reference to FIG. 7.

The audiovisual program may include merely one visual frame or may include one frame of a sequence of frames from a video. For example, the operation of running an audiovisual program may initiate a continuous audiovisual sequence (e.g., a Quicktime movie) or merely continue at a particular point within the movie. By way of another example, the audiovisual program may have only one frame. By way of another example, the audiovisual program may include an interactive game, wherein the player is directed to perform certain tasks on the game board.

After the audiovisual program is initiated or continued, the extracted data information is recorded in operation 506. After the extracted data is recorded, the process returns to operation 503, where portions of the game board are scanned once again to extract data.

After portions of the game board are scanned once again, operations 504 through 505 are repeated and may use the previously recorded data.

Figure 6:
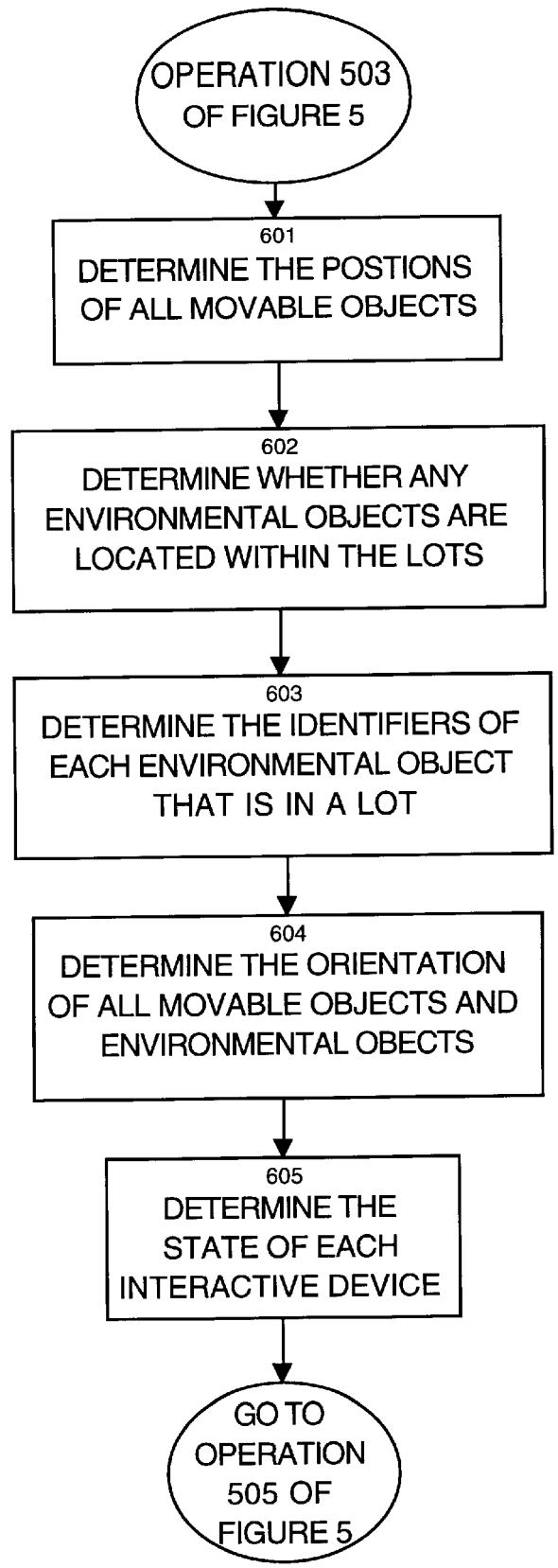
FIG. 6 is a flowchart illustrating the process of FIG. 5 of interpreting the extracted data in accordance with one embodiment of the present invention.

FIG. 6 is a flowchart illustrating the process 504 of FIG. 5 of interpreting the extracted data in accordance with one embodiment of the present invention. Initially, the positions of all moveable objects are determined in operation 601. Next, in operation 602 it is determined whether any environmental objects are located within the lots of the game system. In operation 603, the identifiers of each environmental object that is located in any one of the lots are then determined. This determination may be accomplished by scanning portions of the game system, for example, for bar code identifiers. Alternatively, the identifiers may be derived from the position of the environmental object and predetermined knowledge of the layout of the game board since we know which game board is on the platform. The orientation of all moveable objects and environmental objects are then determined in operation 604. Next, in operation 605 the state of each interactive device is determined. The process 503 then proceeds to operation 505 of FIG. 5, where an audiovisual program is run based on the interpretation of the extracted data.

It should be well understood to those skilled in the art that steps 601 through operation 605 may be executed in any order that is appropriate for the particular application. For example, operation 604 may be executed subsequent to operation 605. Additionally, other information from the extracted data may be interpreted or not interpreted depending on the particular requirements of the particular application. For example, if the game system does not include any interactive devices, operation 605 is not required. By way of another example, an operation to determine the identification of the game board may be included in order to aid in choosing which audiovisual program will be run in operation 505 of FIG. 5. After the extracted data is interpreted, operation 505 of FIG. 5 is executed.

Figure 7:
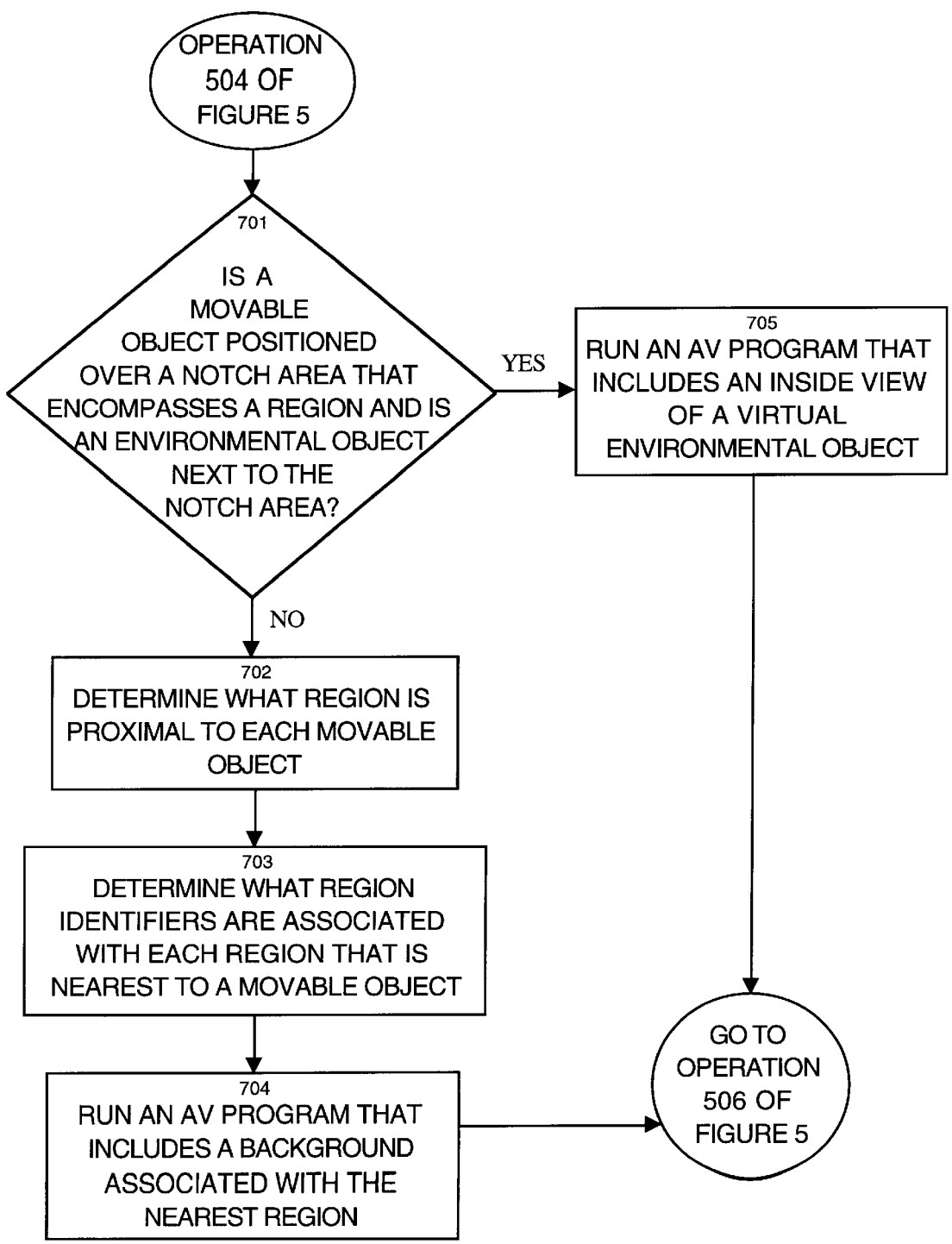
FIG. 7 is a flowchart illustrating the process of FIG. 5 of running an audiovisual program that is based on the interpretation of the extracted data in accordance with one embodiment of the present invention.

FIG. 7 is a flowchart illustrating the process 505 of FIG. 5 of running an audiovisual program that is based on the interpretation of the extracted data in accordance with one embodiment of the present invention. Initially, in operation 701 it is determined whether a movable object is positioned over a notch area (e.g., 334c of FIG. 3B) that encompasses a notch region 334a, for example, of the road system shown in FIG. 3A. If a moveable object is positioned over a notch area that encompasses a notch region and if there is an environmental object in a lot that is proximal to the notch, in operation 705 an audiovisual program is run that includes an inside view of a virtual environmental object. Each environmental object may have more than one proximal notch region; preferably, each notch region would trigger a different audiovisual program. Alternatively, the movable object's orientation with respect to the environmental program may affect which audiovisual program is run.

Figure 9:
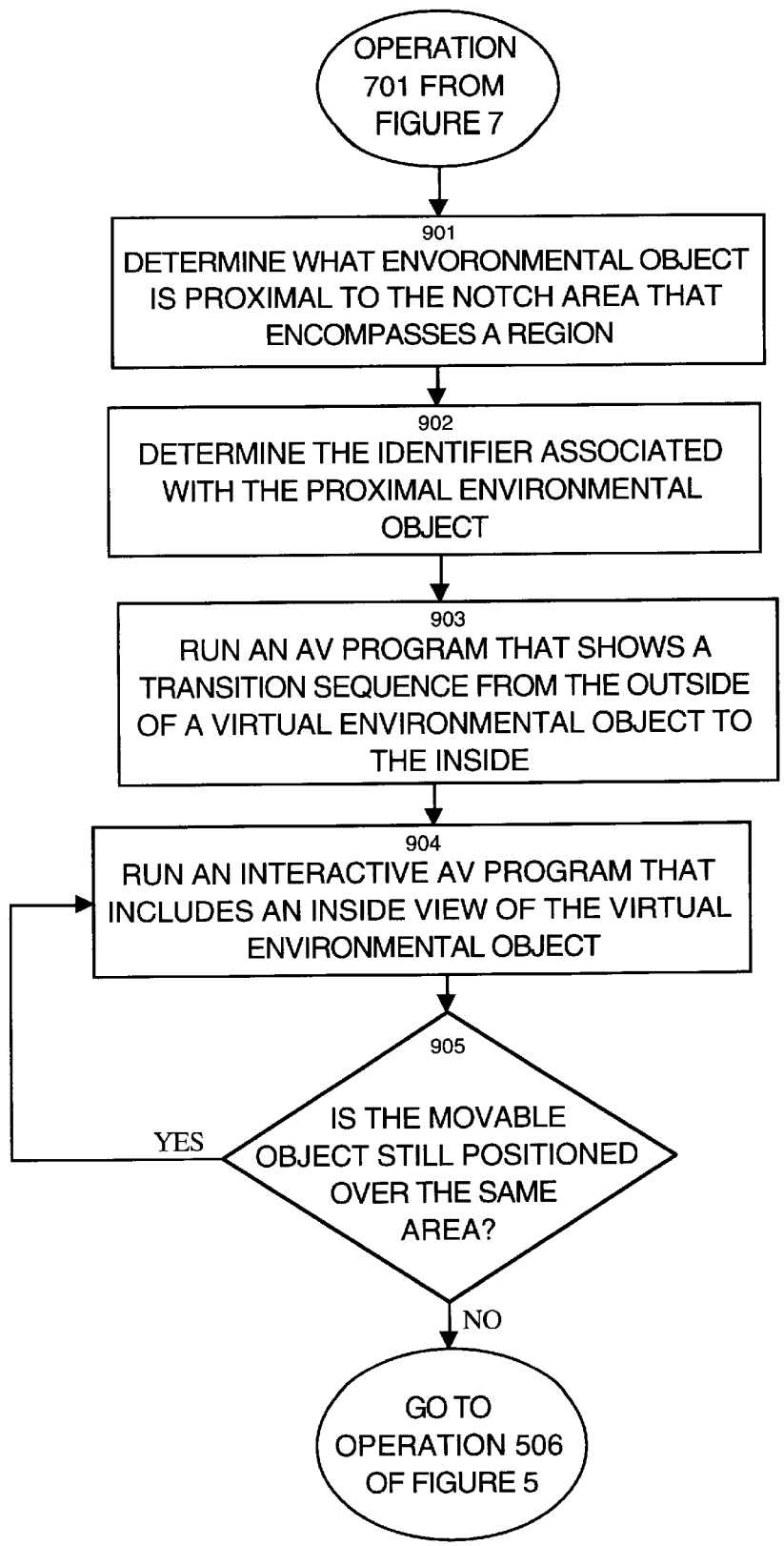
FIG. 9 is a flowchart illustrating the process of FIG. 7 of running an audiovisual program that includes an inside view of a virtual environmental object in accordance with one embodiment of the present invention.

FIG. 9 illustrates the process 705 of FIG. 7 of running an audiovisual program that includes an inside view of a virtual environmental object. FIG. 9 is described in detail below. After the audiovisual program is run, control is transferred to operation 506 of FIG. 5, where the extracted data is recorded.

As shown in FIG. 7, if a moveable object is not positioned over an area that encompasses a region, operation 702 is then executed. In operation 702, it is determined what region is proximal to each moveable object. This determination step is accomplished by computing the distance between the moveable object and each region. Of course, if there is more than one movable object, the nearest region is computed for each movable object. The region that has the shortest distance to each moveable object is the region that is proximal or nearest to the moveable object. Next, in operation 703 it is determined what region identifiers are associated with each region that is nearest to a moveable object. In operation 704, an audiovisual program is run that includes a background associated with the nearest region, which nearest region was determined in operation 702. Operation 704 is described below in more detail in reference to FIG. 8. After the audiovisual program is run, the process proceeds to operation 506 of FIG. 5, where the extracted data is recorded.

Figure 8:
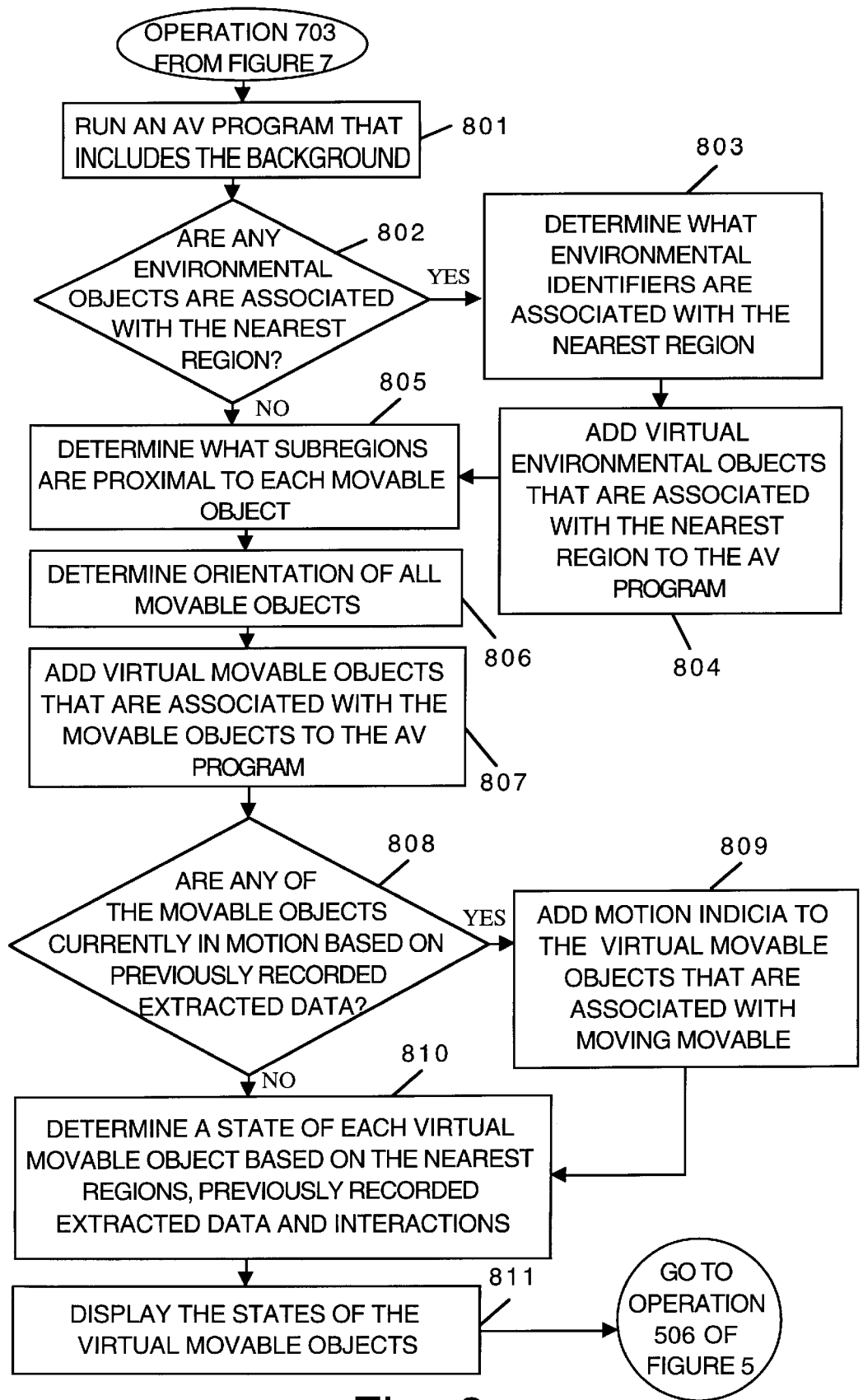
FIG. 8 is a flowchart illustrating the process of FIG. 7 of running an audiovisual program that includes a background associated with the nearest region in accordance with one embodiment of the present invention.

FIG. 8 is a flowchart illustrating the process 704 of FIG. 7 of running an audiovisual program that includes a background associated with the nearest region in accordance with one embodiment of the present invention. Initially, in operation 801, an audiovisual program that includes the background that is associated with the nearest region is run. The background may include visual effects, as well as audio effects. Next, in operation 802, it is determined whether any environmental objects are associated with the nearest region. As discussed above, the audiovisual program may include the initial frame of a plurality of frames or movie, or a continuation within a movie.

If any environmental objects are associated with the nearest region, in operation 803 it is determined what environmental identifiers are associated with the nearest region. After the environmental identifiers are determined, in operation 804 virtual environmental objects are added to the audiovisual program that was initiated or continued in operation 801. The audiovisual program may also be based on the orientation of the environmental objects that are associated with the nearest region. If no environmental objects are associated with the nearest region, in operation 805 it is determined what subregions are proximal to each moveable object. Similar to the operation for determining what region is proximal to each moveable object, the nearest subregion to a moveable object is determined by computing the distance between the moveable object and each subregion.

After the nearest subregion is found, the orientation of all moveable objects is determined in operation 806. Next, in operation 807 virtual moveable objects that are associated with the moveable objects on the game board are added to the audiovisual program. In operation 808, it is then determined whether any of the moveable objects are currently in motion based on previously recorded extracted data. If any of the moveable objects are in motion, control is transferred to operation 809, and motion indicia are added to the virtual moveable objects that are associated with the moving moveable objects on the game board. In one embodiment, the audiovisual program changes as a result of previously recorded data. For example, if its determined that the movable object (or taxicab) is going too fast, a virtual cop car appears in the audiovisual program.

Next, the process proceeds to operation 810. Operation 810 is also executed if the moveable objects are not currently in motion. In operation 810, the state of each virtual moveable object is determined based on the nearest regions, previously recorded extracted data, and previous or current interactions between the player and the objects of the game board. After the states of each moveable object are determined, the state of the virtual moveable objects are displayed in the audiovisual program in operation 811. Finally, the process continues to operation 506 of FIG. 5, where the extracted data is recorded.

FIG. 9 is a flowchart illustrating the process 705 of FIG. 7 of running an audiovisual program that includes an inside view of a virtual environmental object in accordance with one embodiment of the present invention. Initially, in operation 901 it is determined what environmental object is proximal to the notch area that encompasses a notch region, Next, the identifier associated with the proximal environmental object is determined in operation 902. In operation 903, an audiovisual program is run that shows a transition sequence from the outside of the a virtual environmental object to the inside of the virtual environmental object.

An interactive audiovisual program is then run or continued in operation 904. The interactive audiovisual program includes an inside view of the virtual environmental object. As will be discussed below, the interactive audiovisual program will be related to the particular environmental object that is proximal to the area that encompasses the region. Finally, it is determined whether the moveable object is still positioned over the same notch area in operation 905. If the moveable object is still positioned over the same area, the interactive audiovisual program is continued in operation 904. If the moveable object is not positioned over the same area, the process proceeds to operation 506 of FIG. 5, where the extracted data is recorded.

A system for interfacing with a game board has been described. In sum, a user may interact with the physical pieces of a physical game system, thereby triggering an audiovisual program. That is, when the user interacts with parts of the physical system, an appropriate audiovisual program is initiated or continued. Each audiovisual program is associated with a portion of the physical system with which the user has interacted. FIGS. 10A through 12B illustrate several examples of user initiated audiovisual programs.

FIGS. 10A and 10B respectively show a portion of the game board and corresponding audiovisual program in accordance with one embodiment of the current invention. As shown in FIG. 10A, the game board includes a road system 1024, a movable object 1026 (or taxicab), and an environmental object 1004 (or drive-through carwash). The taxicab 1026 is being moved by a user along the road system 1024 and into the carwash 1004. When the taxicab is moved into the carwash 1004, an appropriate audiovisual is run, as illustrated in FIG. 10B. As shown, the audiovisual program is in the form of a movie that simulates the inside of a carwash.

Likewise, FIGS. 11A and 11B show respectively a portion of the game board and corresponding audiovisual program in accordance with an alternative embodiment of the current invention. As shown in FIG. 11A, a taxicab 1126 is being moved by a user along a road system 1124 and parked alongside a bakery 1110. The bakery 1110 includes a local interactive device 1128, which is in the shape of a cake slice. When the taxicab is parked alongside the bakery, an appropriate audiovisual is run, as illustrated in FIG. 11B. As shown, the audiovisual program is in the form of a an interactive video sequence that takes place within a virtual bakery. Within the virtual bakery, a virtual baker interacts with a virtual player. For example, the virtual baker requests that the virtual player choose a pie type. In response to the virtual baker's request, the user may manipulate the interactive device 1128 of the bakery 1110 and choose a pie type. When the user manipulates the interactive device 1128, a virtual tray that has virtual pie ingredients rotates within the virtual bakery.

FIGS. 12A and 12B show respectively a portion of the game board and corresponding audiovisual program in accordance with an alternative embodiment of the current invention. As shown in FIG. 12A, the game board includes a road system 1224, a movable object 1226 (or taxicab), and an environmental object 1232 (or telephone booth). The taxicab 1226 is being moved by a user onto a particular region 1233 of the road system 1224 that is alongside the telephone booth 1232. When the taxicab is moved near the particular region, an appropriate audiovisual is run, as illustrated in FIG. 12B. As shown, the audiovisual program includes a background (e.g., the landscape, distant hill, and sky) that is associated with the particular region 1233. The audiovisual program also includes a virtual telephone booth and a virtual movable object.

Although the foregoing invention has been described in some detail for purposes of clarity of understanding, it will be apparent that certain changes and modifications may be practiced within the scope of the appended claims. For example, the audiovisual program may include a split screen view for a game board having multiple movable objects, where one view is used for each movable object. Alternatively, the audiovisual program may include a perspective view from a first movable object, where the perspective view includes a second movable object. Alternatively, the audiovisual program may include a helicopter view of the first and second movable objects.

By way of another example, the audiovisual program may be based on what type of environmental objects are proximal to each other, or what type of environmental objects are proximal to what types of regions. Additionally, the audiovisual program may be based on what type of movable object is being used. In a related embodiment, the movable object and the environmental objects may be indistinguishable. For example, the movable object may include an interactive device, or one of the environmental objects may be movable. Accordingly, the present embodiments are to be considered as illustrative and not restrictive, and the invention is not to be limited to the details given herein, but may be modified within the scope and equivalents of the appended claims.

What is claimed is:

1. A method of interfacing with a physical game system that includes a platform having a plurality of regions and a plurality of lots, a plurality of environmental objects that are each stationatily position able within a selected one of the lots of the platform, and a movable object movable relative to the regions, wherein each environmental object has an environmental identifier and each region has a region identifier and a plurality of subregions, the method comprising the acts of:
    a) scanning the environmental objects and the movable object positioned on the platform to extract data, the extracted data including a position of the movable object and a position for each environmental object positioned within an associated lot of the platform; and
    b) running an audiovisual program based at least on the position of the movable object relative to the position of at least one of the environmental objects and its associated identifier.

2. The method recited in claim 1 wherein at least one of the environmental objects includes an interactive device that has a plurality of environmental states, the extracted data includes the environmental state of the interactive device of at least one the environment objects and wherein the art of running the audio-visual program is further based on which region is nearest the movable object and the associated environmental state of the interactive device of the environmental object that is associated with the nearest region.

3. The method recited in claim 1, wherein the act of running the audiovisual is further based on which region is nearest to the movable object, and which environmnental objects are associated with the nearest region, and a predetermined knowledge of the physical game system.

4. The method recited in claim 1, wherein the act of running the audiovisual program is further based on a subregion that is nearest to the movable object.

5. The method recited in claim 3, wherein the e environmental objects that are associated with the nearest region are within a predetermined distance from the nearest region.

6. The method recited in claim 1, wherein each environmental object is movable into and out of any one of the plurality of lots.

7. The method recited in claim 1, wherein the audiovisual program being run includes an inside perspective view of the environmental object that is associated with a region that is nearest to the movable object.

8. The method recited in claim 2, wherein the interactive device of the at least one environmental object has either a global type or a local type and the act of running the audiovisual program is further based on the environmental state of the interactive device when it has a global type.

9. The method recited in claim 1, wherein the extracted data includes an orientation for each environmental object and the act of running the audiovisual program is further based on the orientations of the environmnental objects that are associated with the nearest regions.

10. A method of interfacing with a physical game system that includes a platform having a plurality of regions and a plurality of lots, a plurality of environmental objects positioned within an associated lot of the platform, and a movable object positioned proximal to at least one region, wherein each environmental object has an environmental identifier and is a global type or a local type and each region has a region identifier and a plurality of subregions, the method comprising the acts of:
    a) scanning the environmental objects and the movable object to extract data, the extracted data including a movable, object position of the removable object and an environmental position for each environmental object and associated environmental identifier;
    b) determining which region is nearest to the movable object by analyzing the extracted data and computing the distance between the movable object and each region that is proximal to the movable object;
    c) determining which region identifier is associated with the nearest region to the movable object by analyzing the extracted data;
    d) determining whether any of the environmental objects are associated with the nearest region by analyzing the extracted data;
    e) determining whether any environmental identifiers are associated with the nearest region by analyzing the extracted data; and
    f) running audiovisual program based at least on the determinations of the region identifier associated with the nearest region and any environmental objects that are associated with the nearest region,
        wherein the audiovisual program being run includes an inside perspective view of the environmental object that is associated with the nearest region,
        wherein the audiovisual program includes displaying a sequence of transition images that begin with an outside perspective view of the environmental object that is associated with the nearest region and end with the inside perspective view of the environmental object that is associated with the nearest region.

11. The method recited in claim 1, wherein the audiovisual program includes displaying a background image that is associated with a region that is nearest to the movable object.

12. The method recited in claim 4, wherein the audiovisual program includes:
    displaying a background image that is associated with a region that is nearest to the movable object;
    displaying a virtual environmental object that is associated with the environmental object associated with the nearest region; and
    displaying a virtual movable object that is associated with the movable object, the virtual movable object being at a relative position to the displayed environmental objects or background image based on the nearest subregion to the movable object.

13. The method recited in claim 1 wherein the audiovisual program includes displaying a virtual movable object that is associated with the movable object.

14. The method recited in claim 12, wherein the audiovisual program includes displaying movement indicate when the movable object has been moved.

15. The method recited in claim 7, wherein the audiovisual program includes displaying a selected frame of a sequence of frames based on the nearest subregion.

16. The method recited in claim 12, wherein the virtual environmental object is a building.

17. The method recited in claim 12, wherein the audiovisual program includes displaying a movable object state associated with the virtual movable object based on the region identifier of the nearest region.

18. The method recited in claim 17, wherein the movable object state is one of the group comprising clean, dirty, damaged, undamaged, and gas level.

19. The method recited in claim 11, wherein the audiovisual program includes an interactive sequence with a virtual interactive object, wherein a user may interact with the virtual interactive object by manipulation of the interactive device of the environmental object associated with the nearest region or the interactive device of one of the environmental objects that has a global type.

20. The method recited in claim 12, wherein the audiovisual program includes displaying a virtual object associated with the environmental object.

21. The method recited in claim 1, wherein the extracted data includes a movable object identifier and the audiovisual program is based on the movable object identifier.

22. The method recited in claim 1, further comprising determining whether a particular one of the environmental objects is within one of the lots, and wherein the audiovisual program is based on the determination of whether a particular one of the environmental objects is within one of the lots.

23. The method recited in claim 1, further comprising the act of recording the extracted data and repeating acts a) and b), and wherein the repeated audiovisual program is based on the recorded data.

24. A computer system for interacting with a game system that includes a platform that includes a plurality of regions and a plurality of lots, a plurality of environmental objects positioned within an associated lot of the platform, and a movable object positioned proximal to at least one region, wherein each environmental object has an environmental identifier and each region has a region identifier and a plurality of subregions, the computer system comprising:

a data input device for receiving data that is extracted from the physical system, the extracted data including a movable object position of the movable object and an environmental position for each environmental object and associated environmental identifier;

a data interpreter for analyzing the extracted data to determine which region is nearest to the movable object, which region identifier is associated with the nearest region, whether any of the environmental objects are associated with the nearest region, and which environmental identifiers are associated with the nearest region; and a display device for outputting an interactive visual image that is related to the determined nearest region and corresponding region identifier, the environmental objects and environmental identifiers that are associated with the nearest region.

25. The computer system recited in claim 24, further comprising:

a audio system for outputting sounds associated with the visual image, nearest region and corresponding identifier, or environmental objects and environmental identifiers that are associated with the nearest region.

26. The computer system recited in claim 24, wherein the data input device is configured to receive data that is output from a video camera that scans the environmental objects and the movable objects.

27. The computer system recited in claim 24, wherein the data input device is configured to receive data that is output from a electromagnetic sensing apparatus that senses the environmental objects and the movable objects.

28. The computer system recited in claim 24, wherein the movable object position is extracted in three dimensions.

29. A computer interface device for receiving input from a game system that includes a platform, a movable object, and a plurality of environmental objects, each environmental object having a defined type and for outputting a plurality of images to a audiovisual device, the computer system comprising:

input device for receiving extracted data from the physical system, the extracted data including a current position for each environmental object and a current position of the movable object relative to the positions of the plurality of environmental objects and associated defined type;

an interface processor for selecting one of the images based on an analysis of the extracted data, the interface processor being operable to output a first image having a first perspective view and a second image having a second perspective view that is different than the first perspective view; and an output device for receiving input from the interface processor and for outputting the selected image to the audiovisual device.

30. The computer interface device of claim 29, wherein the first perspective view is an inside view that is representative of an inside of one of the environmental objects, and the second perspective is an outside view that is representative of the movable object and an outside of one of the environmental objects.

31. A machine readable medium storing program instructions for interfacing with a physical game system that includes a platform having a plurality of regions and a plurality of lots, a plurality of environmental objects that are each stationarily position able within a selected one of the lots of the platform, and a movable object movable relative to the regions wherein each environmental object has an environmental identifier and each region has a region identifier and a plurality of subregions, the program instructions comprising the following steps:

providing input from a scan of the environmental objects, and the movable objects to extract data, the extracted data including a position of the movable object and a position for each environmental object positioned within an associated lot of the platform; and running an audiovisual program based at least on the position of the movable object relative to the position of at least one of the environmental objects and its associated identifier.

32. A method of interfacing with a physical game system that includes a platform and a plurality of physical objects placeable upon the platform, each physical object being associated with an identifier, the method comprising the acts of:

passively detecting a first position of a first one of the plurality of physical objects;

passively detecting a second position of a second one of the plurality of movable objects; and running an audiovisual program based at least on a distance between the first and second positions of the first and second movable objects.

33. A method as recited in claim 32, wherein the positions of the first and second physical objects are detected utilizing a camera system.

34. A method as recited in claim 32, wherein the positions of the first and second physical objects are detected utilizing an electromagnetic detection system.

35. A machine readable medium storing program instructions for interfacing with a physical game system that includes a platform and a plurality of physical objects placeable upon the platform, each physical object being associated with an identifier, the program instructions comprising the following steps:

passively detecting a first position of a first one of the plurality of physical objects;

passively detecting a second position of a second one of the plurality of physical objects; and running an audiovisual program based at least on a distance between the first and second positions of the first and second physical objects.

36. A machine readable medium storing program instructions for interfacing with a physical game system that includes a platform and a plurality of physical objects placeable upon the platform, each physical object being associated with an identifier, the program instructions comprising the following steps:

at different times, detecting a plurality of positions of a first one of the plurality of physical objects;

at different times, detecting a plurality of positions of a second one of the plurality of physical objects;

storing the plurality of positions of the first physical object and the second physical object; and running an audiovisual program based at least on the stored positions of the first physical object relative to the stored positions of the second physical object.

37. A machine readable medium as recited in claim 36 wherein the audiovisual program is further based on the identity of the first physical object and the identity of the second physical object.

38. A machine readable medium as recited in claim 36 wherein the audiovisual program displays a representation of a current position of the first physical object and the representation varies with different past positions of the first physical object.

* * * * *